United States Patent Office 2,799,095
Patented July 16, 1957

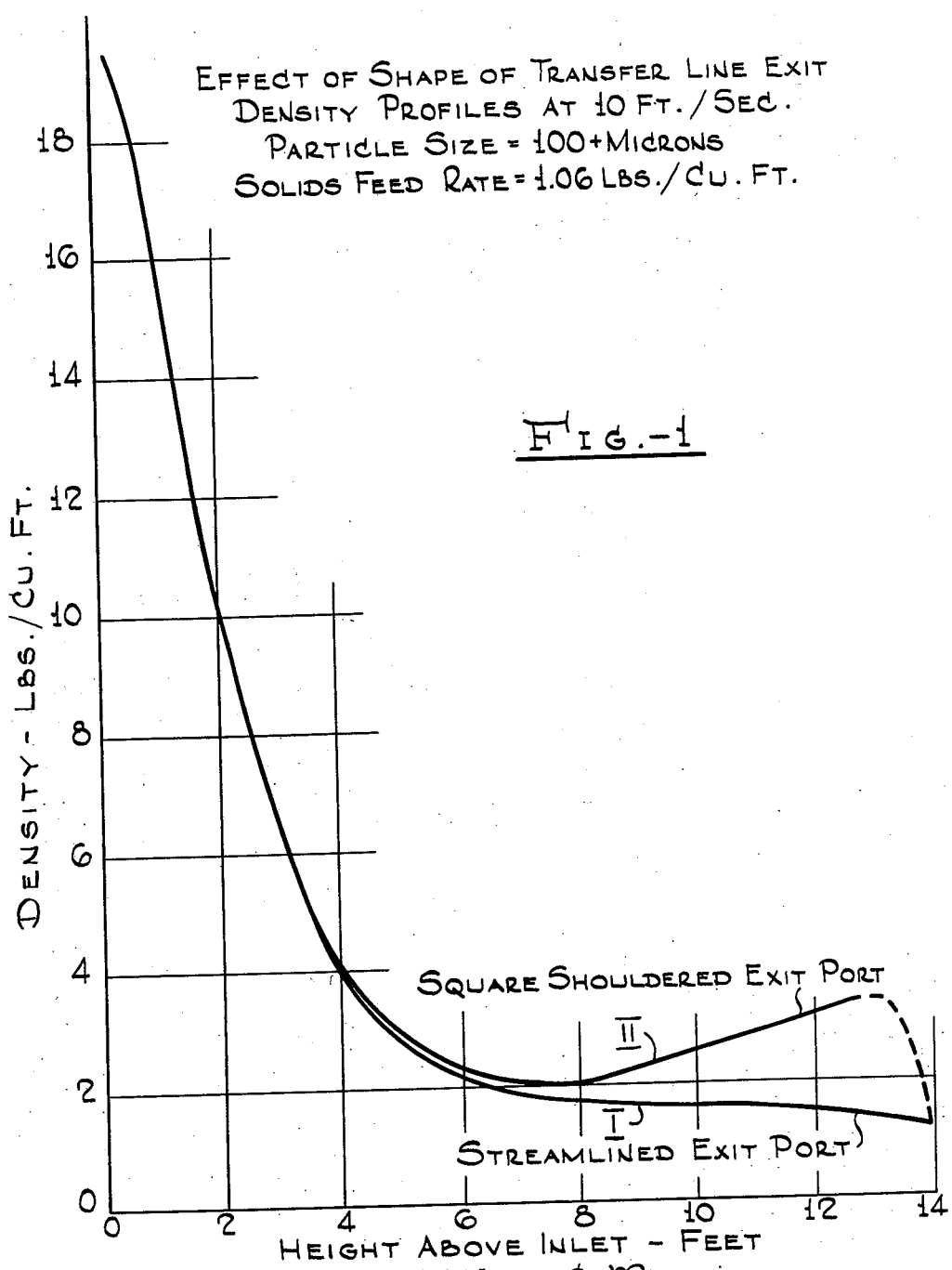

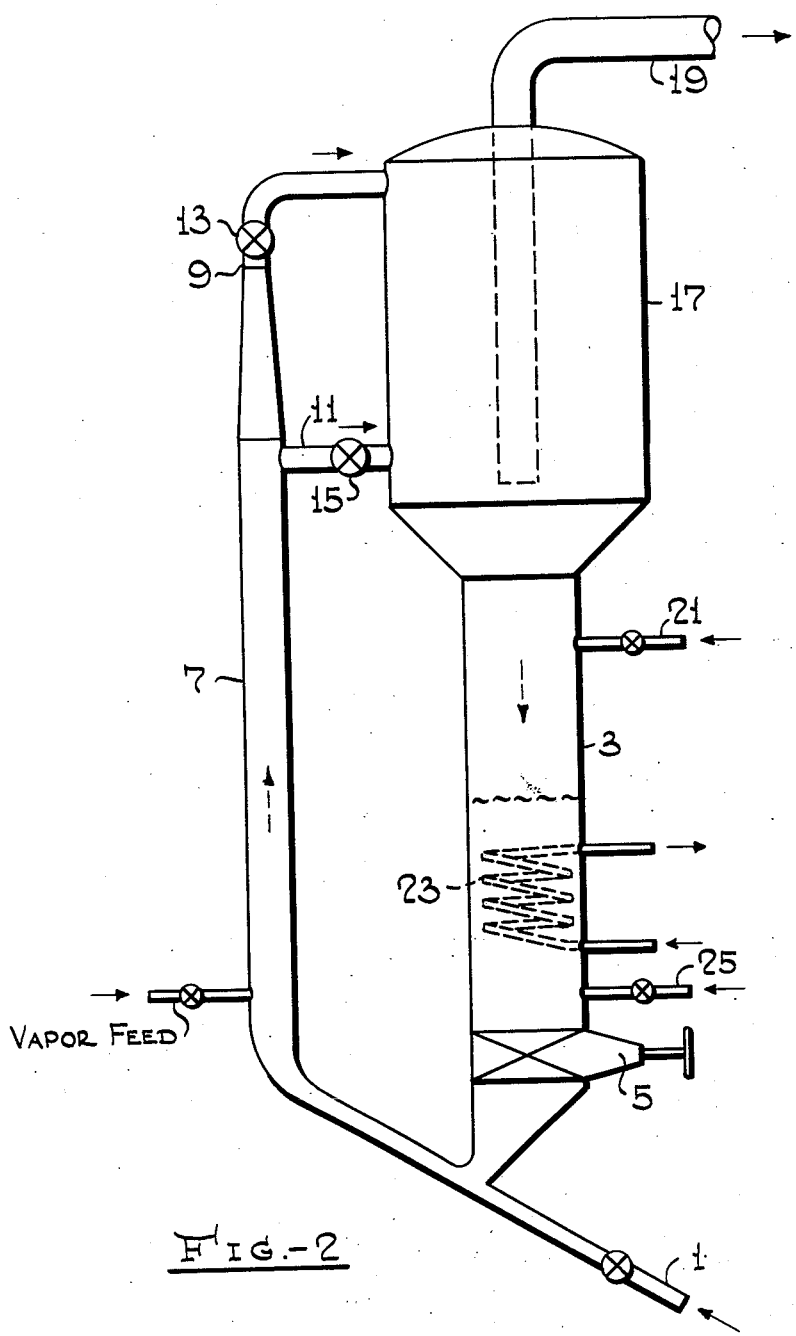

2,799,095
CONTACTING FLUIDS WITH SUBDIVIDED SOLIDS FOR SHORT CONTACT TIMES

Walter G. May, Union, and Stephen H. Dole, Westfield, N. J., assignors to Esso Research and Engineering Company, a corporation of Delaware Application November 30, 1951, Serial No. 259,136

3 Claims. (Cl. 34—10)

The present invention relates to the short-time contacting of fluids with subdivided solids. More particularly, the invention pertains to an improved method and apparatus for controlling the degree of contacting between fluids and solids in processes involving chemical and/or physical changes of the fluids or solids and requiring short times of contact between fluids and solids to prevent overtreating.

Broadly, the invention provides for passing an intimate mixture of fluids and finely divided solids at treating conditions upwardly through an extended narrowly confined path into a fluid-solids separation zone at high fluid velocities conducive to the desired short contact time on said path and abruptly changing the direction of flow of at least a portion of the mixture immediately prior to leaving said path, so as to flow at a sharp angle with the direction of fluid flow in preceding portions of said path.

The invention is particularly useful in chemical reactions employing dust clouds in transfer line reactors. The production of phthalic anhydride from naphthalene by oxidation with vanadium oxide is an example of such reactions. Contact time between naphthalene vapors and vanadium oxide must be limited to prevent over-oxidation of the hydrocarbon. High velocity transfer line contacting is suitable for this purpose.

In processes of this and similar types, the degree of conversion depends to a large extent on the ratio of solids to reacting vapors or gases in the transfer line reactor. The higher this ratio, i. e. the higher the solids holdup in the reactor the higher the degree of conversion. The particle size of the solids is limited by the requirement of a large surface for efficient vapor-solid contacting. On the other hand, high vapor velocities are needed to cut down vapor-solids contact time. The result is that transfer line operation inherently involves high solids entrainment and relatively low suspension densities, that is low solids hold-up conducive to undesirably low conversions.

In conventional transfer line operation, solids hold-up and with it degree of conversion are controlled by varying the solids feed rate. However, this method of controlling conversion is not always feasible. In the first place, it tends to increase solids inventory requirements and thus affects the economics of the process. Also in most cases, the solids serve purposes of heat and temperature control in addition to their catalytic and/or chemical action. Variations in the solids feed rate for the purpose of conversion control, therefore, simultaneously affect other process variables which is undesirable. It is also well known that beyond a certain critical limit further increases in the solids feed rate have very little, if any, effect on the solids hold-up in conventional operation.

Varying the vapor velocity is another means for controlling solids hold-up, the latter being the higher the lower the vapor velocity at otherwise equal conditions. However, again other process variables, particularly vapor-solids contact time, are simultaneously affected by this control method.

There is, therefore, a strong need for a method of controlling suspension density or solids holdup in transfer line reactors independently of solids feed rate and vapor or gas velocity. The present invention provides such a method.

It is, therefore, the principal object of this invention to provide improved means for controlling the degree of contacting in the short-time contacting of fluids with solids. A more specific object of the invention is to control solids holdup and degree of conversion in the short-time contacting of vapors or gases with subdivided solids in transfer line type of operations without affecting other variables of the process.

Other objects and advantages will appear from the description of the invention hereafter wherein reference will be made to the accompanying drawing in which Figure 1 is a graph indicating the effects obtainable by the process of the invention; and Figure 2 is a semi-diagrammatical illustration of a form of apparatus adapted to carry out a preferred embodiment of the invention.

Experimental studies have demonstrated that the shape of the exit port of a transfer line-type gas-solids contacting vessel has a marked effect on the density profile of the suspension flowing upwardly through the column. More specifically, it has been found that at gas velocities of about 10–20 ft. per second and conventional fluidizable solids particle sizes of, say, about 50–150 microns diameter, the density of the suspension decreases rapidly over the height of the transfer line. For example, with solids fed to the transfer line at the rate of 1 lb. per cu. ft. of gas, this density decreases from about 8–20 lbs. per cu. ft. in the bottom portion to about 1.1 lbs. per cu. ft. in the top portion. The slight increase of about 10% in the solids concentration in the top of the column relative to the exit and feed concentration (1.1 lbs. per cu. ft. compared with 1.0 lb. per cu. ft.) is due to a limited amount of settling of the solids relative to the gas. This applies to the use of a streamlined exit port which provides little, if any, obstruction for the upward flow of the suspension. This streamlining of the exit port was obtained by steadily narrowing the diameter of the vertical top portion of the column from 2 inches to 1 inch over a distance of 8 inches. In other words, a reduction to ½ the column diameter over a distance of 4 column diameters. When this streamlined port is replaced by a square shouldered exit port, the ledges of which provide an abrupt restriction in the flow path with a consequent sudden change in the flow direction of the suspension, the density of the suspension in the top portion of the transfer line can be multiplied as much as five-fold.

These effects are graphically illustrated in Figure 1. A synthetic silica-alumina gel having a particle size of about 100 microns diameter was contacted with air in a vertical transfer line having a length of 14 ft. and a diameter of 2 inches. The transfer line was provided with a gas distributing grid in its bottom. Air was fed through the grid at a rate of about 13 cu. ft. per minute to establish a gas velocity of about 10 ft. per second within the transfer line. The solids were supplied immediately above the grid at a rate of about 1 lb. per cut. ft. of gas. The density of the suspension was determined at several points along the height of the transfer line by pressure drop measurements. (Since friction is negligibly small, the pressure drop over a length of column is a direct measure of the density of the solids therein.) Curve I was obtained by using a streamlined exit port as described above and curve II by using a square exit port with horizontal ledges abruptly narrowing down the transfer line diameter from 2 inches to 1 inch.

It will be seen that the densities in the lower portions of the transfer line are the same for both exit ports, the density decreasing rapidly as the distance from the inlet increases. The two curves separates at a level of about 4 ft. above the inlet, curve II for the square shouldered head clearly indicating a higher density. At heights of 8 ft. above the inlet and higher the slopes of the curves are opposite, curve I indicating a further steady density decrease to the top of the transfer line while curve II rises indicating a substantial density increase in the top portions of the transfer line.

The increase in total solids hold-up obtained by using a square transfer line head in the above experiments was about 12.5%. Similar experiments carried out at different conditions indicate that hold-up increases as great as 40% and greater may be obtained in this manner. This increase will be the greater the more severe the constriction in the transfer line top at otherwise equal conditions. For the same top restriction, the percent hold-up increase is the greater the higher the gas velocity and the shorter the transfer line.

Similar experiments carried out at a velocity of 14 ft. per second using a square shouldered exit port narrowing the column diameter from 2 inches down to ¾ inch resulted in an even more pronounced effect. The solids feed rate and the exit concentration was about 0.64 lbs. per cu. ft. as compared with a density varying from about 1.7 lbs. per cu. ft. at the 5 ft. level to about 7.5 lbs. per cu. ft. at the 13 ft. level. These experiments demonstrate that the magnitude of the concentrating effect noted is a function of the magnitude of the change imposed on the gas stream lines.

On the basis of the findings reported above, the present invention provides for controlling the solids hold-up in a transfer line contacting zone by abruptly changing the direction of flow of a controlled portion of the upwardly flowing suspension immediately prior to leaving the transfer line. The change in the direction of flow should be such that said portion flows at a sharp angle with the direction of flow in lower portions of the transfer line. The divergence from vertical flow must be substantially in excess of 5° and, preferably, is maintained above 60°, say between about 60° and 180°. Good results are readily obtained at an angle of about 90°.

In accordance with the preferred embodiment of the invention, two exit ports are provided in the top of the transfer line. One exit port is streamlined and discharges from the top of the transfer line substantially in the direction of flow of the suspension in lower portions of the transfer line, thus offering a minimum of flow obstruction. The other port discharges from a point adjacent to, but below, the top of the transfer line at a sharp angle to the direction of suspension flow in the transfer line. Preferably this angular exit port is also constricted to a diameter less than that of the transfer line.

Specific designs of these exit ports depend on the conditions of flow and intensity of effect desired. Quite generally, it may be stated that density increases in transfer line operations, of about 100-500% may be accomplished by providing for deviations of the flow direction of the entire suspension from the vertical of up to about 90° combined with flow path constrictions to, say, about 25-50% of the transfer line diameter in the angular exit port. Lesser effects may be obtained by withdrawing varying proportions of the suspension through the streamlined port. The latter should consist of a constriction of the vertical flow path which is gradually increased in a vertical upward direction; the profile of the inside wall of this port should be a smoothly drawn curve meeting the vertical wall of the transfer line asymptotically or at an angle not exceeding 5°. Maximum constriction should be attained at a point not less than 3 transfer line diameters above the beginning of the constriction, the smallest diameter being about 25-50% of the transfer line diameter.

By controlling the relative ratio of discharge through these two ports, the solids hold-up within the transfer line may be adjusted to any desired level within a fairly wide range of densities without any change in other contacting conditions, such as feed ratio, velocities, etc. When the streamlined port is fully opened and the other port fully closed, solids hold-up will be at a minimum. Maximum solids hold-up is attained by fully closing the streamlined port and withdrawing the suspension exclusively through the other port. All intermediate levels of solids hold-up may be readily attained by a proper adjustment of the suspension flow through the two ports.

Similar effects may be obtained by providing a single streamlined exit port in the top of the transfer line and converting this port mechanically to a square shouldered exit when an increase in solids hold-up is desired. This may be accomplished by means of an adjustable butterfly or iris-type valve arranged in the streamlined top of the transfer line. However, aside from the fact that these arrangements involve mechanical difficulties of operation and maintenance, they are subject to excessive wear by erosion at the high solids velocities prevailing in transfer line operation.

Specific operating conditions depend on the type of process carried out in the transfer line. The invention is useful, quite generally, in any process wherein solid particles are employed in the form of a dust cloud and wherein short controlled times of contact between solids and vapors or gases are required. Examples are chemical reactions, such as the partial oxidation of organic compounds with the aid of solid oxidizing agents or catalysts, coking of heavy hydrocarbonaceous residues on hot subdivided solids, various endothermic or exothermic hydrocarbon conversions, such as cracking, hydrogenation, dehydrogenation, etc.

For most of these processes, solids particle sizes of about 20–400 microns, vapor or gas velocities of about 8–100 ft. per second and gas or vapor residence or contact times of about 0.1–10 seconds are suitable. The average solids hold-up in the transfer line may be maintained at these conditions within the broad range of about 1–15 lbs. per cu. ft., variations of about 5–500% being permitted within this range by the control method of the present invention. The magnitude of this effect will depend to some extent on the particle size together with the gas velocity. With solids of a narrow range of particle sizes satisfactory operation may be obtained with typical combinations as follows:

| Gas Velocity (ft./sec.) | Satisfactory Particle Size Range (Microns) |
| --- | --- |
| 10 | 50–350 |
| 100 | 200–1,000 |

If the solids have a wide distribution of particle sizes, then part of the material may lie outside the ranges shown above without detrimental effects. For example, at 10 ft. per second the solids may contain a few percent of material of 20 microns diameter or less, provided the bulk of the material is 50 microns or more.

Having set forth its objects and general nature, the invention will be best understood from the following more detailed description wherein reference will be made to Figure 2 of the drawing.

Referring now to Figure 2, the system illustrated therein essentially comprises a transfer line reactor 7, a cyclone separator 17, and a solids return pipe 3. The functions and coaction of these elements will be forthwith described using the oxidation of naphthalene with vanadium pentoxide to form phthalic anhydride as an example. It should be understood however that the system may be used in a substantially analogous manner to carry out other short-time reactions involving gas-solids contacting.

In operation, a carrier gas preferably containing free oxygen, such as air or steam mixed with oxygen, is supplied to the system via line 1. Hot vanadium pentoxide is supplied from standpipe 3 to line 1 at a rate controlled by slide valve 5 and at a temperature of about 850°–1000° F. The particle size of the vanadium pentoxide may be relatively coarse, within the approximate limits of 60–80 mesh.

A dilute suspension of solids in carrier gas, having a temperature of about 800°–1000° F. enters the bottom of transfer line reactor 7. Naphthalene vapors are supplied at this point. The feed rate of carrier gas and naphthalene vapors should be so controlled that a linear vapor velocity of about 10–30 ft. per second is established in transfer line reactor 7. Vanadium pentoxide may be fed at a rate of about 0.2–1.2 lbs. per cu. ft. of gas fed. The length of transfer line 7 is preferably so chosen that a vapor residence time of about 0.3–1.5 seconds is provided at these conditions. Pipes about 6–40 ft. long and about 6–24 inches wide are normally suitable in commercial operation involving naphthalene throughputs of about 450–7200 lbs. per day.

At the conditions specified, a temperature of about 950°–1100° F. is maintained in transfer line 7. A relatively dilute suspension of solids in vapors and gases is formed which, due to limited hindered settling of solids, may have an average density of about 1.0–4.0 lbs. per cu. ft. (at a feed rate of 0.6 lb. per cu. ft.). This density may be controlled within the range specified in accordance with the invention.

For the latter purpose, transfer line reactor 7 is provided with two outlet lines 9 and 11 carrying valves 13 and 15, respectively. Line 9 forms a streamlined exit port offering little, if any, obstruction to the flow of the suspension as a result of a steady reduction of the line diameter by about 50% over a distance of about 4 transfer line diameters. Line 11, having a diameter about ¼–¾ of that of line 7, forms a right angle with transfer line reactor 7. When in use, line 11 suddenly restricts the flow path and forces an abrupt change in the flow direction of the suspension. When valve 13 is fully opened and valve 15 fully closed the average density of the suspesion, i. e. the solids hold-up in transfer line reactor 7, is at a minimum for the prevailing feed rates of solids, vapors and gases. In order to increase the solids hold up, valve 13 is closed and valve 15 opened to any desired degree. The result is that a corresponding proportion of the suspension is forced through the rectangular constricted path prescribed by line 11 and the effect of a square-shouldered exit port is obtained to a corresponding degree.

More specifically, at the conditions specified above, operating with valve 13 open and valve 15 completely closed, the solids hold-up may be maintained at a minimum of about 1.0 lbs. per cu. ft. Opening 15 and closing valve 13 completely will increase the solids hold-up to a maximum of about 4.0 lbs. per cu. ft. All intermediate densities may be maintained by setting valves 13 and 15 in intermediate positions.

Reaction takes place in reactor 7 within the residence time specified. Abut 85% of the naphthalene feed is converted into phthalic acid which is quickly removed from the reactor as it is formed. In order further to prevent overtreating the suspension removed via line 9 and/or 11 is directly passed to a gas-solids separator, such as a cyclone separator 17, wherein vapors and gases are separated from the solids. The vapors and gases are passed via line 19 to conventional product recovery equipment (not shown).

Separated used vanadium oxide, substantial proportions of which are now in the reduced form of a tetraoxide or even of a lower oxidation stage, falls down into standpipe 3 to be collected in the lower portion thereof.

A stripping gas, such as steam, may be injected through line 21 to remove vapors entrained by the separated solids. A heat exchange coil 23 may be arranged in the lower portion of standpipe 3 to control the solids at a temperature not below, and preferably exceeding, the reaction temperature in reactor 7, as specified above. An oxidizing gas, such as air or oxygen or steam mixed with oxygen, may be supplied via line 25 to maintain the solids in a mobile readily flowing condition and to re-oxidize reduced portions to the pentoxide state.

Various details of the operation, particularly reaction conditions specific for naphthalene oxidation have been omitted for the sake of simplicity. These conditions are well known in the art as demonstrated by such patents as U. S. 2,526,689 which may be resorted to for specific details.

The system illustrated in the drawing permits of various modifications; for example valve 13 may have the form of a butterfly, flapper or iris-type valve or similar adjustable flow restriction. Other modifications within the spirit of the invention may appear to those skilled in the art.

As pointed out before, the system of the drawing may be used for many other reactions. These include broadly the oxidation of aromatic hydrocarbons, such as ortho-substituted benzenes to the corresponding acids; oxidation of benzene or hydrocarbon fractions containing $C_4$ constituents to form maleic anhydride; oxidation of o-toluic acid to phthalic acid; oxidation of heterocylic compounds to form the corresponding acids or other carboxy compounds; conversion of ethylene to ethylene oxide; of propylene to acrolein; etc. Also nonoxidative reactions, such as coking of reduced crude on hot carrier solids; catalytic cracking; hydrogenation; dehydrogenation; etc. may be carried out in a similar manner.

The above description and exemplary operation have served to illustrate specific embodiments of the invention. Other modifications which may appear to those skilled in the art are within the scope of the invention.

What is claimed is:

1. In a process wherein a gasiform fluid is contacted with particles of finely divided solids by introducing said fluid into a vertically extended, narrowly defined flow path at the inlet thereof, passing said fluid upwardly through said flow path as a continuous flow stream to which said solid particles are introduced into said flow stream substantially at the inlet to said flow path to be dispersed uniformly in said flow stream and carried thereby in suspension therein through said flow path in substantially uniform flow velocity relation to said fluid, and wherein said fluid and solid particles are discharged from said flow path at the upper end thereof at substantially the rate of introduction thereof into said flow path, the steps which comprise introducing each of said fluid and said solid particles into said flow path at a substantially constant initial rate, and so as to maintain a substantially constant flow velocity of said flow stream through said flow path, discharging said flow stream, including solid particles suspended therein from the upper end of said flow path in the direction of flow therethrough and in substantially continuous flow relation with said flow stream as a portion of gradually and smoothly reduced cross-sectional area in said flow direction, and increasing the density of solid particles in the flow stream at the upper end of said flow path, whereby to increase the degree of contact between said fluid and said particles in said flow path, by preferentially discharging a portion of said flow stream, including solid particles suspended therein, angularly from said flow path immediately downstream from the upper end thereof as a flow stream portion of sharply and abruptly reduced cross-sectional area.

2. A process according to claim 1, in which said preferential portion is discharged from said flow path at angle substantially in excess of 5° from the direction of flow through said flow path.

3. A process according to claim 1, in which said solid particles are introduced into said flow path at a rate initially to establish a density of said particles in said flow stream, substantially at the upper end of said flow path, of about 1.0 pound per cubic foot of said gasiform fluid, and wherein the density of the solid particles per cubic foot of said gasiform fluid is increased over a range from said initial density to about 4.0 pounds per cubic foot by said preferential discharge of a portion of said flow stream.

References Cited in the file of this patent

UNITED STATES PATENTS

| | | |
|---|---|---|
| 2,054,441 | Peebles | Sept. 15, 1936 |
| 2,334,553 | Harding | Nov. 16, 1943 |
| 2,351,091 | Bar | June 13, 1944 |
| 2,364,145 | Huppke et al. | Dec. 5, 1944 |
| 2,373,008 | Becker | Apr. 3, 1945 |
| 2,379,448 | Linn | July 3, 1945 |
| 2,403,375 | Kassel | July 2, 1946 |
| 2,489,347 | Rollman | Nov. 29, 1949 |
| 2,526,689 | Rollman | Oct. 24, 1950 |
| 2,585,274 | Reichl | Feb. 12, 1952 |
| 2,587,554 | Weikart | Feb. 26, 1952 |
| 2,590,219 | Stephanoff | Mar. 25, 1952 |
| 2,595,255 | Holder | May 6, 1952 |

FOREIGN PATENTS

| | | |
|---|---|---|
| 592,354 | Great Britain | Sept. 16, 1947 |